F. W. MORSE.
SEAT CUSHION SPRING.
APPLICATION FILED APR. 17, 1922.
1,430,249. Patented Sept. 26, 1922.
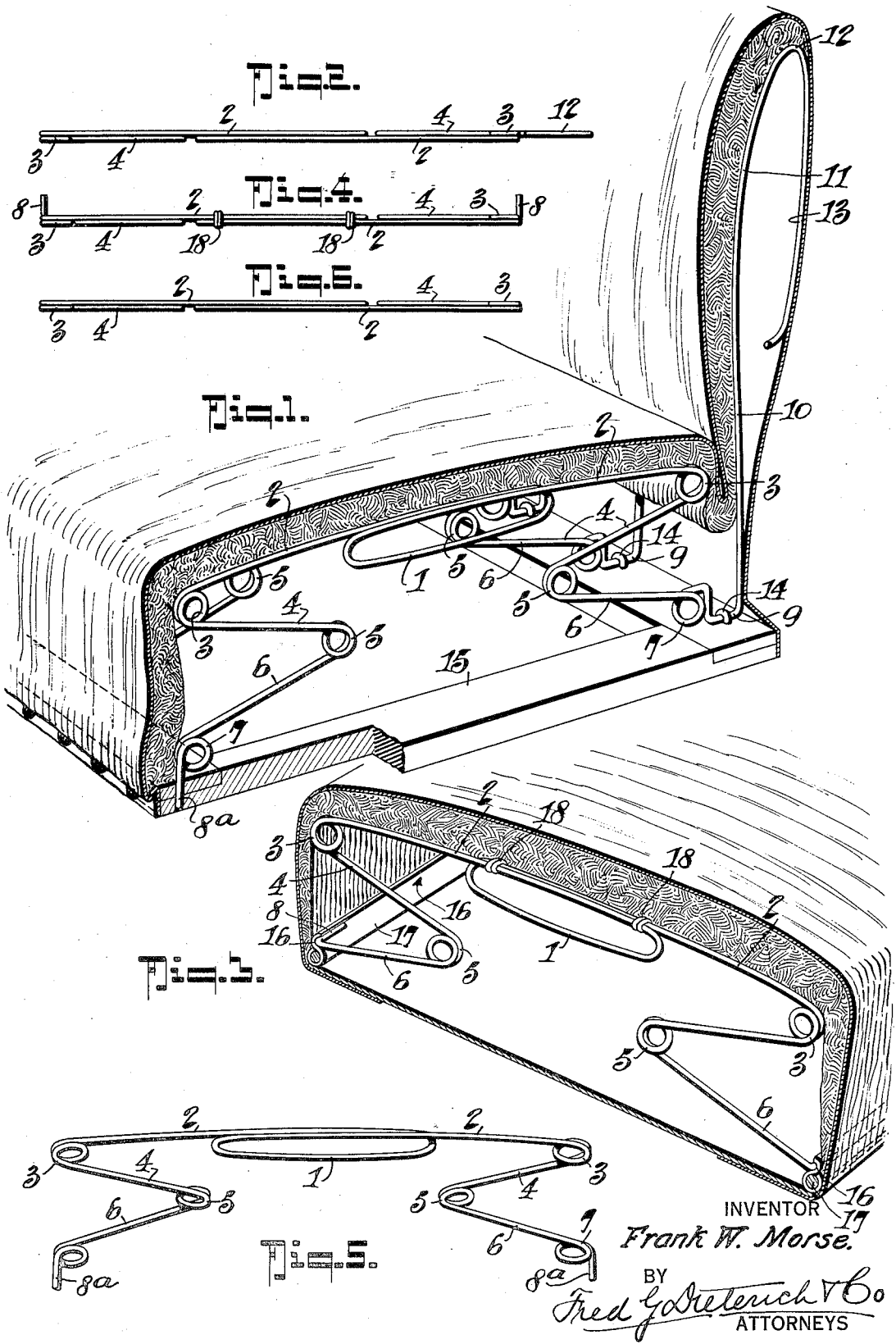
INVENTOR
Frank W. Morse.
BY
Fred G. Dieterich & Co
ATTORNEYS Patented Sept. 26, 1922.

1,430,249

UNITED STATES PATENT OFFICE.

FRANK W. MORSE, OF SAN FERNANDO, CALIFORNIA, ASSIGNOR OF ONE-HALF TO SAN FERNANDO MANUFACTURING ASSOCIATION, OF SAN FERNANDO, CALIFORNIA.

SEAT-CUSHION SPRING.

Application filed April 17, 1922. Serial No. 553,673.

*To all whom it may concern:*

Be it known that I, FRANK W. MORSE, a citizen of the United States, residing at San Fernando, in the county of Los Angeles and State of California, have invented a new and useful Improvement in Seat-Cushion Springs, of which the following is a specification.

My invention relates to certain new and useful improvements in seat cushion springs for automobiles and furniture and the invention has for its object to provide such a spring in which the life of the spring is greatly lengthened and the elasticity and shock resisting qualities are greatly multiplied by its novel form of construction.

Another object of the invention is to provide a spring construction of such form that the pressure on the spring, when in use, is with the grain of the wire instead of a twist of the grain of the wire as in the spiral springs at present in common use.

A further object of my invention is to provide a spring device in the construction of which is obtained the desired form and elasticity assuring comfort and ease to the occupant.

Another object of the invention is to provide a construction of cushion spring in which the shock absorbing qualities are greatly strengthened and a spring which may be made in any size and shape for any desired seat.

In its generic nature, the invention comprises a spring composed of a single strand of spring wire and having a crown loop from each end of which the wire extends and is then zig zagged downwardly with coils at the corners of the zig zag to form the seat spring with provisions for securing it to the seat frame and, when the spring is to include a back, one portion of the wire is extended upwardly and looped back upon itself to form the back spring.

In its more detailed nature, the invention includes those novel features of construction, combination and arrangement of parts, all of which will be first fully described and then be specifically pointed out in the appended claims, reference being had to the accompanying drawings, in which:

Figure 1 is a perspective view of one embodiment of my invention.

Figure 2 is a top plan view of one of the spring units shown in Figure 1.

Figure 3 is a perspective view of another embodiment of the invention adapted for a seat cushion having a metallic frame.

Figure 4 is a top plan view of one of the spring units shown in Figure 3.

Figure 5 is a detail perspective view (looking down) of another slight modification of the invention showing the seat spring adapted for fitting onto a wooden seat frame of the type shown in Figure 1.

Figure 6 is a top plan view of the spring shown in Figure 5.

In the drawings in which like numerals and letters of reference indicate like parts in all of the figures, I have illustrated my improved construction of cushion spring as especially adapted for use in connection with an automobile chair or couch seat cushion and I desire it understood that any number of springs may be used, depending upon the size of the cushion or seat and the character of the cushion which is to be equipped with my type of spring.

The form of the invention shown in Figure 1 is particularly adapted for use on automobile cushions of the driver's seat where it is desired to provide an auxiliary back to locate the driver nearer the steering wheel. In this form of the invention, as in the other forms hereinafter referred to, the spring consists of a single strand of wire provided with a crown loop 1 from which the wire extends, as at 2—2, and is coiled at 3—3; from the coils 3 the wire is extended backwardly or inwardly as at 4—4 and coiled at 5—5 and then extended forwardly and rearwardly or outwardly again as at 6—6. In the form shown in Figure 1, at the lower ends of sections 6 the wire is again coiled as at 7 and the end of the wire secured to the wooden frame 15. This is done, in the form shown in Figure 1, by having one end 8ª of the wire extended to a hole in the frame 5, while the other end is bent horizontally at 9 and stapled down at 14 to the frame, from which portion 9 the wire extends vertically as at 10 and is bowed at 11 and bent back upon itself as at 13, the upper end 12 of the loop 11—13 being located at a sufficient height to form a convenient back rest for the user.

In the form shown in Figure 3, the ends 8—8 of the wire are bent laterally, instead of vertically downward, and project into the groove 16 of the metal frame which thus holds the spring in place.

In the form shown in Figure 5, both ends of the wire project down to enter holes in the wood frame 15. If desired the crown loop may be tied at 18 (see Figure 3).

The spring shown in Figures 3 and 5 is employed when merely a seat cushion is to be provided but where the cushion is to be provided with a back portion, the form of the invention shown in Figure 1 is employed.

While I have shown and described my invention in certain preferred embodiments, i. e., with loops and coils at certain distances along the single strand of wire, the said loops and coils may be multiplied and changed to conform with the style of seats and form of furniture in such a way that ease, strength and durability may be attained.

What I claim is:

1. A spring composed of a single strand of spring wire including a crown loop, crown end coils, inward V-shaped extensions from said coils with coils at the apexes of the V and means to secure the ends of the wire to the supporting frame of the seat.

2. A spring composed of a single strand of spring wire including a crown loop, crown end coils, inward V-shaped extensions from said coils with coils at the apexes of the V, means for securing the front of said wire to a seat frame, said wire being extended from the back of the seat portion to rest on the seat frame and then extended upwardly and bent back upon itself to constitute a back spring member.

3. A spring composed of a single strand of spring wire including a crown loop, crown end coils, inward V-shaped extensions from said coils with coils at the apexes of the V, said wire being coiled adjacent to its ends and provided with means by which it may be secured to a seat frame.

4. A spring composed of a single strand of spring wire including a crown loop, crown end coils, inward V-shaped extensions from said coils with coils at the apexes of the V, said wire having portions adapted to be secured to a seat frame and provided with coils adjacent to said portion.

5. A spring composed of a single strand of spring wire including a crown loop, crown end coils, inward V-shaped extensions from said coils with coils at the apexes of the V, said wire having portions adapted to be secured to a seat frame and provided with coils adjacent to said portion, said wire extending from one of said securable portions upwardly and being looped back upon itself to constitute a back spring portion.

FRANK W. MORSE.